United States Patent [19]
Morrel-Samuels

[11] Patent Number: 6,007,340
[45] Date of Patent: Dec. 28, 1999

[54] METHOD AND SYSTEM FOR MEASURING LEADERSHIP EFFECTIVENESS

[75] Inventor: Palmer Morrel-Samuels, Chelsea, Mich.

[73] Assignee: Electronic Data Systems Corporation, Plano, Tex.

[21] Appl. No.: 09/054,102

[22] Filed: Apr. 2, 1998

Related U.S. Application Data

[62] Division of application No. 08/625,967, Apr. 1, 1996, Pat. No. 5,743,742.

[51] Int. Cl.[6] ............................ G09B 19/00; G09B 19/18
[52] U.S. Cl. ............................................ 434/236; 434/107
[58] Field of Search .................................. 434/236, 107, 434/322; 283/67

[56] References Cited

U.S. PATENT DOCUMENTS

| | | | |
|---|---|---|---|
| 4,627,818 | 12/1986 | Von Fellenberg | 434/322 |
| 4,671,772 | 6/1987 | Slade et al. | 434/219 |
| 4,773,011 | 9/1988 | VanHoose | 364/424 |
| 4,937,439 | 6/1990 | Wanninger et al. | 235/456 |
| 5,365,425 | 11/1994 | Torma et al. | 365/401 |
| 5,486,999 | 1/1996 | Mebane | 364/401 |

OTHER PUBLICATIONS

Crystal, Barbara; "The 360 degree assessment"; Healthcare Executive; Chicago; pp. 1–4, Dec. 1994.

Dorgan, William J. III; "Supervisors make lousy managers (sometimes)"; Modern Machine Shop; Abstract, Jan. 1996.

Anonymous; "MCI publishes senior management standards"; Leadership & Organization Development Journal; Bradford, 1995.

*Peer Review*, EDS Peer Review Publication, Copyright © 1993 Electronic Data Systems Corporation.

*Primary Examiner*—Robert A. Hafer
*Assistant Examiner*—John Edmund Rovnak
*Attorney, Agent, or Firm*—L. Joy Griebenow; Baker & Botts L.L.P.

[57] ABSTRACT

Assessment tool (12) for gathering meaningful information concerning an object. The assessment tool (12) includes a plurality of statements (40) directed toward observable characteristics of the object. A frequency estimation scale (42) corresponds to each statement (40). At least one statement (40) is reverse keyed from the remaining statements (40).

8 Claims, 3 Drawing Sheets

FIG. 1A

Leadership Development Profile

Directions

Marking Instructions

CORRECT MARK   INCORRECT MARKS

Participant I.D.

In completing this questionaire and rating this person:
○
○
○
○

| Never | | | | | | Always | |
|---|---|---|---|---|---|---|---|
| 1 | 2 | 3 | 4 | 5 | 6 | 7 | NB |

First Section
1. Earns respect from others for high consistency between attitudes and behaviors.
2. Forgets commitments and promises.
3. Leads by setting a good example.
4. Makes honesty a high priority in all circumstances.
5. Demonstrates commitment to EDS Values.
6. Ignores issues that pertain to fairness in the work place.
7. Exemplifies leadership guided by strong personal values and solid integrity.

Second Section
8. Uses innovative thinking to solve complex problems.
9. Fails to maintain an appropriate balance between addressing business and interpersonal issues.
10. Continues to seek and to learn new information that may help EDS.
11. Fails to promote productive debate and discussion.
12. Constructively challenges the current state of affairs by championing new initiatives for improvement.
13. Actively searches for promising opportunities to expand EDS' business.
14. Exemplifies leadership based on intelligent, visionary thinking.

| Never | | | | | | Always | |
|---|---|---|---|---|---|---|---|
| 1 | 2 | 3 | 4 | 5 | 6 | 7 | NB |

| Never | | | | | Always | | |
|---|---|---|---|---|---|---|---|
| 1 | 2 | 3 | 4 | 5 | 6 | 7 | NB |

Third Section — 24
15. Establishes loyal and enduring relationships.
16. Shows little or no desire to discuss the views and opinions of others.
17. Expresses own opinions with perspective and emotional maturity.
18. Demonstrates a positive and constructive outlook.
19. Manipulates situations to secure personal success above all else.
20. Builds relationships based on mutual respect.
21. Exemplifies the ability to build good working relationships that are based on emotional maturity.

Fourth Section — 26
22. Inspires people to excel.
23. Lacks the ability to build positive excitement in the organization.
24. Acts on constructive feedback.
25. Inspires people to care about their work.
26. Lets improved performance pass without recognition or reward.
27. Uses communication skills to motivate people.
28. Exemplifies the ideal model of an inspirational leader.

Fifth Section — 28
29. Publicly rewards the team based on the success of its combined efforts.
30. Leverages the dissimilar skills and styles of diverse work teams to achieve superior results.
31. Fails to reach an effective balance between retaining and delegating authority.
32. Promotes productive cooperation between groups within EDS.
33. Works to foster a sense of mutual accountability among team members.
34. Assigns diversity a very low priority in the team.
35. Exemplifies what it means to use effective leadership skills to promote good teamwork.

Sixth Section — 30
36. Faces difficult situations with courage and persistence.
37. Has the confidence to make sound decisions even in adverse circumstances.
38. Accepts the negative consequences of risk-taking graciously and confidently.
39. Lacks the confidence to defend a justifiable but unpopular decision.
40. Takes risks by trying out new ideas, approaches, or methods.
41. Welcomes exploration by championing new ideas and encouraging others to do the same.
42. Exemplifies leadership that is guided by confident and constructive risk-taking.

Seventh Section — 32
43. Seems to thrive in high stress situations.
44. Delights in rising to the challenges of the future.
45. Shows little interest in improving performance beyond the minimal acceptable level.
46. Is driven to move information quickly and accurately within the organization.
47. Avoids pushing projects to achieve results beyond expectations.
48. Works with a well-paced energetic drive.
49. Exemplifies the ideal model of a leader that is motivated to excel.

Eighth Section — 62
50. In your opinion, how frequently during the last 12 months did this leader's team achieve high productivity?
51. In your opinion, how frequently during the last 12 months did this leader's team generate high profits or high value for the company?
52. In your opinion, how frequently during the last 12 months did the output of this leader's team constitute high quality work?
53. In your opinion, how frequently during the last 12 months did this leader's team have high overall job satisfaction?

| Never | | | | | | Always | |
|---|---|---|---|---|---|---|---|
| 1 | 2 | 3 | 4 | 5 | 6 | 7 | NB |

FIG. 2

FIG. 3

METHOD AND SYSTEM FOR MEASURING LEADERSHIP EFFECTIVENESS

This is a division of application Ser. No. 08/625,967, filed Apr. 1, 1996, U.S. Pat. No. 5,743,742.

TECHNICAL FIELD OF THE INVENTION

The present invention relates generally to a method and system for measuring effectiveness of an object, and more particularly to a system for, and method of, measuring leadership effectiveness of a manager.

BACKGROUND OF THE INVENTION

Competent management is generally recognized as essential to the success of a business. To obtain competent management, businesses often employ performance appraisals as an integral part of management training and promotion programs. Typically, an appraisal comprises a questionnaire or other type of survey device for eliciting responses from the manager to be evaluated and from selected co-workers. The survey may include a series of questions designed to obtain responses suitable for developing data respecting the strength and weaknesses of the manager, in relation to management duties, and how the performance of the manager is perceived by others. Frequently, the response data is compiled for review by the manager as a feedback device, upon which to base corrective action, or otherwise inspire improvement.

Existing evaluation tools, however, are largely ineffective because they often yield results that are unreliable in that they are not capable of reproduction and that are invalid in that they are incorrect. This is particularly problematic because federal law now requires that any evaluation having an impact on employee promotion, demotion, assignment, training, or job responsibilities, be able to prove its reliability and validity. Accordingly, there exists a need in the art for an improved tool for evaluating the leadership effectiveness of a manager.

SUMMARY OF THE INVENTION

In accordance with the present invention, a system and method of evaluating leadership effectiveness of a manager, or other types of effectiveness of an object, is provided that substantially eliminates or reduces the disadvantages and problems associated with prior evaluation tools.

In accordance with the present invention, an assessment tool for gathering meaningful information concerning an object includes a plurality of statements directed toward observable characteristics of the object. At least one statement is reverse keyed from the remaining statements. A frequency estimation scale corresponds to each statement.

More specifically, the assessment tool may include a legend for the scale. The legend may include a low pole having an infrequent label and a high pole having a frequent label. The infrequent label may be a never label and the frequent label may be an always label. The legend may be prominently displayed a number of times. Moreover, the legend may include a plurality of unlabeled intermediate poles.

Additionally, the assessment tool may include a plurality of sections directed toward different domains. Each section includes at least one statement directed toward an observable characteristic of the object that is relevant to the domain. A statement summarizing the characteristics of the object relevant to the domain may also be provided for each section. The sections may be directed toward the domains of having personal convictions, being visionary, building emotional bonds, being inspirational, being team oriented, being a risk taker, and having a drive to excel. Additionally, a validation section having at least one statement directed toward verifiable performance of a business where the object is employed may be provided.

In accordance with one embodiment, the statements may be of approximate equal length and each generally arranged on a single line. Moreover, the statements and the frequency estimation scales may be printed on a single form having a first side and a second side.

Important technical advantages of the present invention include an improved method and system for measuring leadership effectiveness of a manager, or other types of effectiveness of an object. In particular, the invention provides an assessment tool having good reliability in that its results are capable of reproduction and having good validity in that its results are accurate.

Another important technical advantage of the present invention includes providing an assessment tool that uses objective means for evaluating managers or other objects. Still another important technical advantage of the present invention is that it is gender-neutral and includes the ability to evaluate a manager without introducing bias that could unfairly discriminate against a group.

Other technical advantages are readily apparent to one skilled in the art from the following figures, description, and claims.

BRIEF DESCRIPTION OF THE DRAWINGS

For a more complete understanding of the present invention, and the advantages thereof, reference is now made to the following description taken in conjunction with the accompanying drawings, in which.

DETAILED DESCRIPTION OF THE INVENTION

Figure 1A:
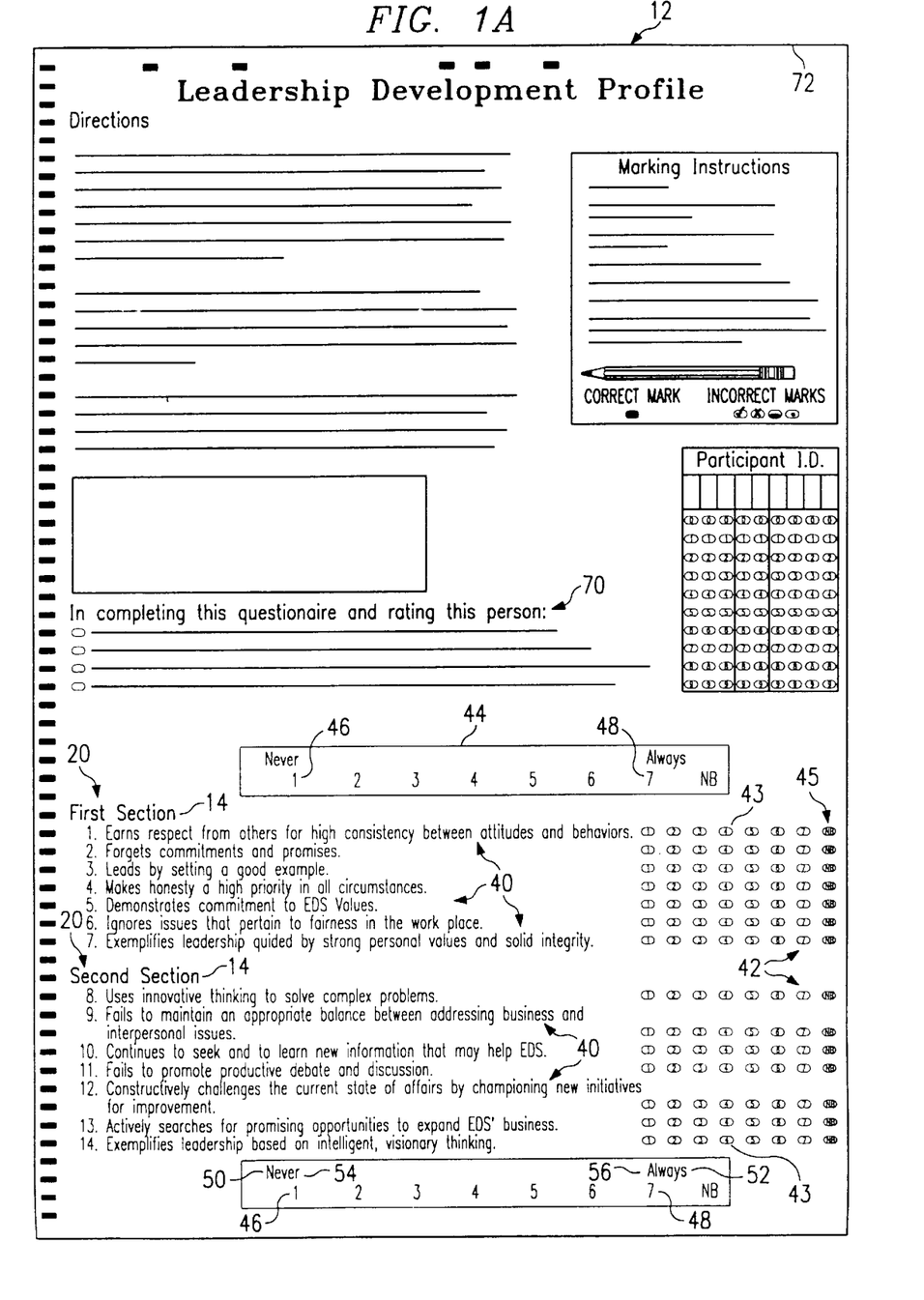
FIGS. 1A–B is a face view of an assessment tool for measuring leadership effectiveness of a manager in accordance with the present invention.
Figure 1B:
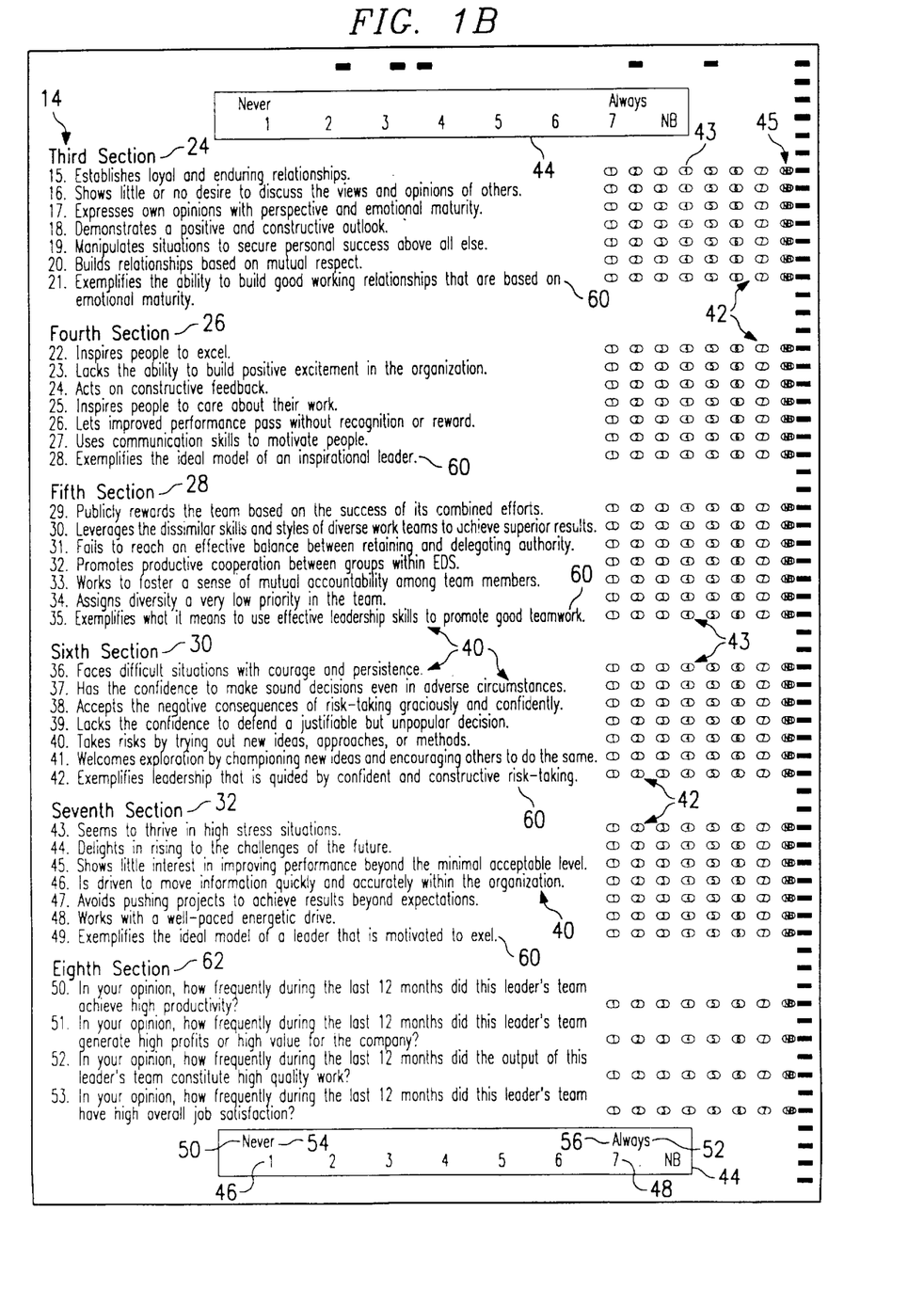
Figure 2:
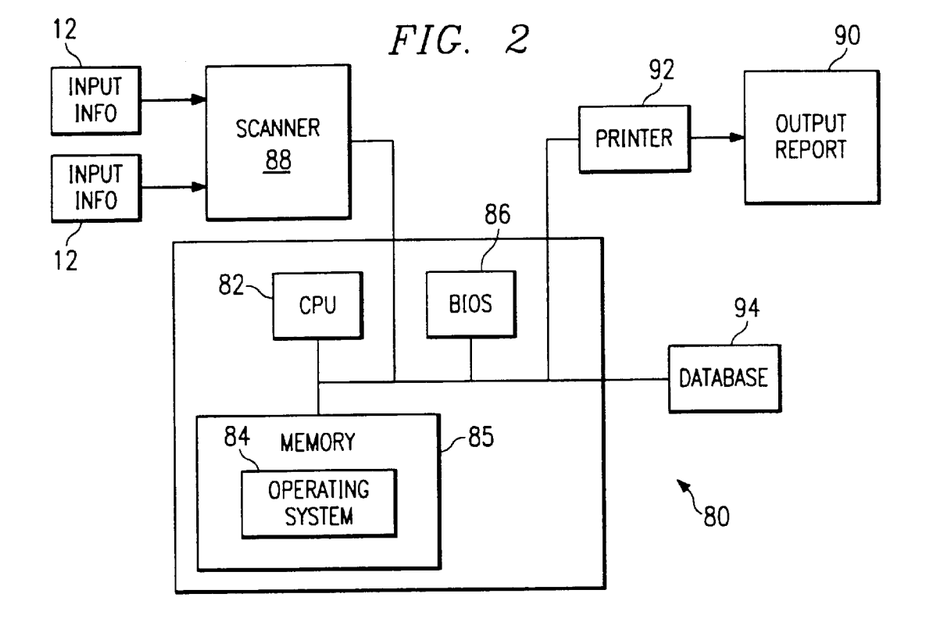
FIG. 2 is a schematic block diagram of a computer system for processing responses to the assessment tool of FIG. 1.
Figure 3:
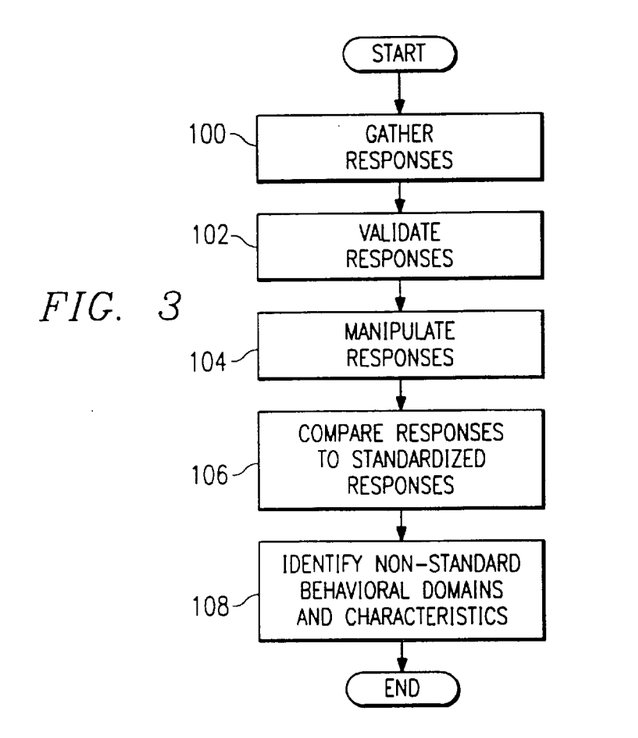
FIG. 3 is a flow chart of a method of measuring leadership effectiveness in accordance with the present invention.

The preferred embodiments of the present invention and its advantages are best understood by referring now to FIGS. 1 through 3 of the drawings, in which like numerals refer to like parts throughout the several views. FIG. 1 shows an assessment tool 12 for measuring the leadership effectiveness of a target manager. In this role, the assessment tool 12 may be used either as a self-development tool, a staff selection tool, or a combination of both. Those skilled in the art will understand that the assessment tool 12 may also be used to measure other types of effectiveness of other types of objects.

As shown in FIG. 1, the assessment tool 12 may include a plurality of sections 14 directed toward different behavioral domains. In one embodiment, the assessment tool 12 includes sections directed toward the behavioral domains of having personal convictions 20, being visionary 22, building emotional bonds 24, being inspirational 26, being team oriented 28, being a risk taker 30 and having a drive to excel 32.

The personal conviction section 22 concerns the core set of values of a manager and how the manager lives his or her life by them. Managers with strong personal convictions will typically passionately communicate what they personally stand for, and this personal conviction is a source of personal integrity. Their ethical compass directs their conduct and is the basis for their confidence, creating a solid foundation for risks and growth.

The visionary section 22 concerns how managers create a view of the future by quickly assimilating new information, concepts, and ideas. Visionary managers are observant, seeing connections in widely disparate events. They selectively eliminate extraneous information, extrapolate from trends, and choose the correct direction. They are able to effectively deal with abstraction, uncertainty, and ambiguity. With strong conviction, they take the necessary risk to pursue their vision.

The emotional bonds section 24 concerns a manager establishing emotional bonds with individuals and the team. Strong bonds are built by caring about team members and their work. Managers with emotional bonds to their team create an environment where people eagerly look forward to coming to work and eliminate fear and intimidation from the work environment. Such managers show respect for others and demonstrate openness, honesty, and fairness in dealing with others.

The inspirational section 26 concerns managers that motivate the team to a higher level of excellence and achievement, while expanding each individual's comfort level. They foster initiative, innovation, creativity, risk taking, and responsibility, resulting in team members—and the team as a whole—achieving goals that stretch each member's capability. They serve as strong, positive role models, and they inspire through personal example.

The team oriented section 28 concerns managers that recognize that a team achieves more than individuals. Such managers help people integrate and leverage individual contributions so that they function as a unified team. They leverage capabilities throughout the company by openly sharing the resources of their team. They adopt the best practices of other teams.

The risk taker section 30 concerns managers who understand that gain can only be achieved with a commensurate level of necessary risk. They naturally accept the risks associated with reaching their vision. Such managers take personal risks in support of their personal convictions and have the courage to pursue their vision even in adverse situations. They try new ideas and accept uncertainty. They accept the risk and discomfort associated with change and seek challenges that others would not seek.

The drive to excel section 32 concerns managers who seek to improve themselves, their team, and the company. Such managers exhibit a great deal of energy, enthusiasm, drive, determination, and tenacity. They seek responsibility and accountability. They constantly seek opportunities to make a greater contribution and impact. They rise to the challenge.

Those skilled in the art will understand that the assessment tool 12 may include all or only some of the above listed behavioral domains, as well as other behavioral domains. Thus, the assessment tool 12 may be adapted to the specific behavioral domains that are important to a particular business. Moreover, completely different behavioral domains may be used to measure the effectiveness of other types of objects.

Each section 14 may include a plurality of statements 40 directed toward observable characteristics of the manager. Thus, the statements 40 are not directed toward thoughts or feelings that are internal and cannot be accurately measured by respondents. Statements are preferred to questions because statements are easier for respondents to conceptualize. Typically, a respondent will read a statement, think of an example of the characteristic to which the statement is directed, and then compare the target manager with their example.

A frequency estimation scale 42 corresponds to each statement 40. Frequency estimation scales 42 are preferred to trait attribution, such as having a respondent rate the honesty of a manager from a scale of good to bad. The frequency estimation scale 42 asks the respondent to check their memory as to how many times they recall the occurrence of the characteristic to which the statement 40 is directed. Accordingly, respondents typically take care to search their memory to determine the frequency of the characteristic being inquired about, and estimate that frequency.

To prevent or greatly reduced response bias, the assessment tool 12 may employ a number of measures in addition to the use of statements 40 and the corresponding frequency estimation scales 42. The frequency estimation scale 42 may include a neutral pole 43. The neutral pole 43 is achieved by employing a scale having an odd number of selections such that the middle selection is neutral. Thus, a respondent can rate the target manager as neutral, which is neither good nor bad.

The frequency estimation scale 42 may also include a non-response option 45. The non-response option 45 allows respondents to honestly respond to statements to which they do not have enough information or experience to judge the target manager. Thus, the non-response option prevents respondents from guessing at characteristics of a target manager that they have not observed.

The assessment tool 12 may include a legend 44 for the scale 42. The legend 44 may include a low pole 46 and a high pole 48. Because the scale 42 is a frequency estimation scale, the low pole 46 should have an infrequent label 50 and the high pole 48 should have a frequent label 52. As shown in FIG. 1, the infrequent label 50 may be a "never" label and the frequent label 52 may be an "always" label.

The infrequent label 50 may include an end 54 disposed directly above the low pole 46. Similarly, the frequent label 52 may include an end 56 disposed directly above the high pole 48. As shown in FIG. 1, the last letter of the infrequent label 50 may form the end 54 disposed directly above the low pole 46. The first letter of the frequent label 52 may form the end 56 disposed directly above the high pole 48. This alignment of the labels ensures that the full range of options is seen by the respondent when the legend 44 is scanned. Viewing of the full range encourages the respondent to use the full range of the frequency estimation scale 42.

Respondents may also be encouraged to use the full range of the frequency estimation scale 42 by prominently displaying the legend 44 on the assessment tool 12. Additionally, a plurality of legends 44 may be displayed at different locations of the assessment tool 12. The repeated display of the legend 44 reminds respondents of the available options and encourages the use of the full range of the scale.

Preferably, the intermediate poles of the scale 42 are not labeled. This allows respondents in different regions to interpret the scale 42 in a similar way. Labeling the intermediate poles with terms such as "very" distorts the results because the meaning of such terms vary in different regions.

Response bias can also be reduced by reverse keying one or more statements 40. In such a case, the high pole 48 is sometimes associated with a favorable response and sometimes associated with an unfavorable response. Similarly, the low pole 46 is sometimes associated with an unfavorable response and sometimes associated with a favorable response. Reverse keying prevents or reduces automatic responses and thus yields more accurate responses.

As shown by FIG. 1, the statements 40 may be of approximately equal length and each generally arranged on a single line. Thus, the statements 40 are short, crisp, and direct. As a result, respondents will understand at a glance that the assessment tool 12 is not unreasonably long and will not rush to finish. Accordingly, better results are obtained by the compact and simple format of the assessment tool 12.

The assessment tool 12 may include a number of validation measures. A summary statement 60 may be used at the end of each section to provide a direct method of testing reliability. The summary statement 60 summarizes the behavioral domain of the section 14. Reliability of the statements 40 of the section 14 are shown by good correlation between a response to the summary statement 60 and the responses to the other statements in the section 14.

The assessment tool 12 may also include a validation section 62. The validation section 62 may include one or more objective and verifiable statements 64. Accordingly, the accuracy of a response, and thus a respondent, may be determined from the validation section 62. The validation section 62 and the summary statement 60 of each section 14 provide the assessment tool 12 with the reliability and validity required by federal law for any assessment having impact on employee promotion, demotion, assignment, training, or job responsibilities.

Validation of the different sections 14 also allows top management to ascertain which behavioral domains are most important to the business. This permits the assessment tool 12 to be revised over time to delete less meaningful domains, to add more meaningful domains or to reflect changes in the corporate culture of the business.

The assessment tool 12 may comprise a respondent section 70 for recording the relationship between the respondent and the target manager. As shown by FIG. 1, the respondent section 70 may include the categories of self, leader, peer/customer, and direct report. Preferably, the respondent sample composition includes a self evaluation, an evaluation by a leader, and three or more evaluations by both peer/customers and direct reports.

The self category is used by the target manager. The leader category is used by the supervisor of the target manager. The peer/customer category is used by both peers and customers of the target manager. The direct report category is used by employees who are supervised by the target manager.

To preserve the validity of the responses, respondents in the peer/customer and direct report categories should be anonymous. This allows such respondents to respond honestly without fear of repercussions. To ensure autonomy of the peer/customer and the direct report respondents, each group should include a minimum of three respondents.

The results obtained from the assessment tool 12 may be kept confidential, only being released back to the target manager and to a reviewing supervisor. However, if desired, a top level management report may be released to top level management. At such a level, no specifics of any target manager are typically given. Instead, the report allows top level management to discern in which areas their managers generally excel and in which areas they generally do poorly. The report also allows top level management to discern variations over time. Thus, the report allows top level management to ascertain whether certain new programs introduced to increase leadership effectiveness are having the desired effect.

The assessment tool 12 may be presented in any suitable medium of expression. For example, the assessment tool 12 may be electronically displayed on a computer monitor or other type of CRT device. Further, as shown by FIG. 1, the assessment tool 12 may be displayed in printed format. In many applications, it will be desired to display the assessment tool 12 in printed form so that it can be used with minimum equipment, namely a writing instrument.

In one embodiment, the assessment tool 12 may be displayed on a computer-readable printed form 72. In this embodiment, respondents typically use a No. 2 type pencil such that responses may be accurately read by a computer. Such computer-readable forms are well known in the art and will not be further described.

FIG. 2 shows a general purpose computer system 80 for receiving the assessment tool 12 and manipulating the responses thereon. The computer system 80 comprises a central processing unit (CPU) 82 that operates the computer system in conjunction with an operating system 84 to retrieve, process, store, and display data.

The CPU 82 is typically implemented as a microprocessor such as that manufactured by Apple Computer or by Intel Corporation. The CPU 82 communicates control, address, and other signals with the operating system 84 and with the remaining components of the computer system 80 through a system bus. According to a specific embodiment of the present invention, the computer system 80 may be an "INTEL" platform manufactured by Compaq Computer.

The operating system 84 comprises a set of computer programs that control the internal functions of the computer system 80, thereby allowing the computer system to run application software. The operating system 84 is typically installed in a mass storage device, such as a hard disk drive, a floppy disk drive, a CD disk drive, or a ROM chip. During boot-up (initialization), the computer system 80, the operating system 84 is loaded into system memory 85.

A basic input/output system (BIOS) driver 86 is stored in system memory 85 along with the operating system 84. The BIOS driver 86 supplies device-level control and support services for primary input/output devices of the computer 80 during the boot process. After a boot, the BIOS driver 86 accepts requests from application programs and from the operating system 84 running on the computer system 80 and performs input/output services as requested by those programs. The functions and operations of conventional BIOS drivers are well known and will not be further described.

A scanner 88 for receiving a printed assessment tool 12 may be provided. The scanner 88 may scan a printed form of the assessment tool 12 and store the responses into a designated file in system memory 85. As described below in detail, the responses may be manipulated to generate an output report 90. A database 94 may be connected to the computer system 80 for use in connection with manipulating the responses. The output report 90 may be printed via a standard printer 92. Scanners, databases and printers are well known in the art and will not be further described.

The method of the present invention for evaluating leadership effectiveness of a manager will now be described. Although the method of the present invention is described in terms of measuring the leadership effectiveness of a manager, those skilled in the art will understand that the present invention encompasses measuring the effectiveness of other types of objects.

As shown in FIG. 3, the method begins at step 100 by gathering responses with the assessment tool 12. As above described, the responses may be gathered on a frequency estimation scale 42 corresponding to a plurality of statements 40 directed toward the observable characteristics of the manager. The responses may be gathered in any media that is computer-readable or that can be translated into a computer-readable media. For example, the responses may be gathered via a computer input device such as a keyboard, mouse, touch screen, or the like.

Next, at step 102, the responses may be validated. As described above, responses may be validated by summary questions 60 for sections of the assessment tool 12 and by the validation section 62 directed toward verifiable performance of the business in which the manager is employed.

Proceeding to step 104, the responses may be manipulated to ascertain the leadership effectiveness of the manager. At this step, responses that cannot be validated may, if desired, be ignored. Responses for which the statements 40 were reverse keyed are reversed such that favorable responses now tend toward the high pole 48 and unfavorable responses now tend toward the low pole 46. Additionally, non-response selections 45 may be treated as neutral pole 43 responses.

Next, at step 106, the manipulated responses may be compared to a set of standardized responses of a business. In one embodiment, the set of standardized responses may be a company average of previous responses. The responses of the target manager, or the self-respondent, may be excluded from responses compared to the set of standardized responses. Thus, the target manager cannot use his or her responses to raise his or her performance. Rather, the target manager's responses may be compared with the responses of other respondents to determine the ability of the target to realistically determine his or her performance.

At step 108, non-standard behavioral domains and characteristics may be identified. In one embodiment, non-standard domains and characteristics are those in which the difference between a target manager's responses and the set of standardized responses is statistically significant. A difference may be statistically significant where the respondent average is one standard deviation or more above or below the company average.

One standard deviation or more above the company average places the manager's performance in the top seventy-fifth percentile or above, meaning that seventy-five percent of all other assessed managers have a score below that of the target. In such a case, the characteristic or behavioral domain may be considered, with considerable confidence, to be a relative strength.

One standard deviation or more below the company average places the respondent's performance in the bottom twenty-fifth percentile or below, meaning that seventy-five percent of all other assessed managers have a score above that of the respondent. In such a case, the behavioral domain or characteristic of the target manager can, with considerable confidence, be considered a relative weakness.

The results may be printed in the form of the output report 90. In one embodiment, the output report 90 includes a summary of the responses for each section 14 representing a behavioral domain and for each statement 40 representing a characteristic. For each section 14 or statement 40, the target manager's self responses and the respondent average can be graphically and/or numerically displayed. Thus, the target manager can easily determine how close his or her own assessment was from that of the other respondents. The respondent averages of the leader, the direct reports and the peer/customers may also be graphically and/or numerically displayed. Additionally, a positive, neutral, or negative performance rating may also be included to inform the target manager of whether he or she is within, above, or below the standard deviation.

From the foregoing description of the present invention, other alternative constructions may suggest themselves to those skilled in the art. Therefore, the scope of the present invention is to be limited only by the claims below and the equivalents thereof.

What is claimed is:

1. A method for evaluating leadership effectiveness, comprising the steps of:
   gathering target information quantifying at least one domain selected from the group consisting of having personal convictions, being visionary, building emotional bonds, being inspirational, being team oriented, being a risk taker and having a drive to excel;
   comparing the target information with a standard, the standard including standard values of the domain; and
   identifying non-standard responses of the target.

2. The method of claim 1, further comprising the steps of gathering target information from the target and a supervisor of the target.

3. The method of claim 1, further comprising the step of gathering target information from a plurality of subordinates of the target.

4. The method of claim 1, further comprising the step of gathering target information from a plurality of peers and customers of the target.

5. The method of claim 1, further comprising the step of manipulating the target information for comparison with the standard.

6. The method of claim 5, the step of manipulating the target information further comprising the step of treating non-response selections as neutral selections.

7. The method of claim 1, further comprising the step of validating the target information by comparing the target information to corresponding validation information gathered with the target information.

8. The method of claim 1, further comprising the steps of:
   validating the target information by comparing the target information to corresponding validation information gathered with the target information; and
   disregarding invalid target information.

* * * * *

US006007340C1

(12) EX PARTE REEXAMINATION CERTIFICATE (5609th)
United States Patent
Morrel-Samuels (10) Number: US 6,007,340 C1
(45) Certificate Issued: Nov. 21, 2006

(54) METHOD AND SYSTEM FOR MEASURING LEADERSHIP EFFECTIVENESS (75) Inventor: Palmer Morrel-Samuels, Chelsea, MI (US)

(73) Assignee: Electronic Data Systems Corporation, Plano, TX (US)

Reexamination Request:
No. 90/006,067, Aug. 28, 2001

Reexamination Certificate for:
Patent No.: 6,007,340
Issued: Dec. 28, 1999
Appl. No.: 09/054,102
Filed: Apr. 2, 1998

Related U.S. Application Data

(62) Division of application No. 08/625,967, filed on Apr. 1, 1996, now Pat. No. 5,743,742.

(51) Int. Cl.
G09B 19/00 (2006.01)
G09B 19/18 (2006.01)

(52) U.S. Cl. .................. 434/236; 434/107
(58) Field of Classification Search ............. None
See application file for complete search history.

(56) References Cited

U.S. PATENT DOCUMENTS

| | | | |
|---|---|---|---|
| 4,627,818 A | * 12/1986 | Von Fellenberg | 434/236 |
| 4,671,772 A | * 6/1987 | Slade et al. | 434/219 |
| 4,773,011 A | * 9/1988 | VanHoose | 701/30 |
| 4,937,439 A | * 6/1990 | Wanninger et al. | 235/456 |
| 5,365,425 A | * 11/1994 | Torma et al. | 705/2 |
| 5,486,999 A | * 1/1996 | Mebane | 705/2 |

OTHER PUBLICATIONS

Personnel Decisions, Inc. "The PROFILOR" Developmental Feedback for Internal Consultants Development Guide—a Workbook for understanding the PROFILOR Feedback Report and formulating a Development Plan. Jul. 1994, pp. 1–36.*

Maynard, Micheline, "Evaluations evolve from botom up/Workers,peers rate managers" USA Today, Arlington, VA, Aug. 3, 1994, p. 06 B.*

O Reilly, Brian, "360 feedback can change your life", FORTUNE, New Yourk; Oct. 17, 1994. vol. 130, Iss. 8; p. 93, 4 pages.*

Marchese, Marc "Industry: The poser of the 360–degree feedback". Pennsylvania CPA Journal. Philadelphia: Dec. 1995. vol. 66, Iss. 6; p. 19, 2 pages.*

Van Velsor, Ellen, et al., "An Examination of the Relationships among Self–Perception Accuracy, Self–Awareness, Gender, and Leader Effectiveness" Human Resource Management, Summer/Fall 1993, vol. 32, Nos. 2 & 3, pp. 249–263.*

Church, Allan, "First–Rate Multirater Feedback", Training & Development, Aug. 1995 p. 42.*

Edwards, Mark et al. "Moving multisource assessment beyond development" ACA Journal, Scottsdale, Winter 1995, vol. 4, Iss. 4; p. 82.*

London, Manuel et al. "360–degree feedback as a competitive advantage", Human Resource Management, Summer/Fall 1993, vol. 32, Nos. 2 & 3, pp. 353–372.*

(Continued)

*Primary Examiner*—David O. Reip (57) ABSTRACT

Assessment tool (12) for gathering meaningful information concerning an object. The assessment tool (12) includes a plurality of statements (40) directed toward observable characteristics of the object. A frequency estimation scale (42) corresponds to each statement (40). At least one statement (40) is reverse keyed from the remaining statements (40).

OTHER PUBLICATIONS

41 CFR 60-3.5, 41 CFR 60—3.14—41 CFR 60-3.16, accessed through [http:/www.dol.gov/esa/regs/cfr/41cfr/toc_Chapt60...htm].*

Hogg et al., "Is the psychological screening of police applicants a realistic goal—The success and failures of psychological screening", National Police Research Unit, report series No. 124, Australia 1995.*

AERA et al, "Conventional views of reliability", from APA Standards of Educational and Psychological testing, Washington DC 1985.*

"Grading the boss's performance. (Upward Feedback process developed by Atomic Energy of Canada Limited Research)." CMA—the Management Accounting Magazine, v66, n5, p. 10, Jun. 1992.*

* cited by examiner

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–8 are cancelled.

* * * * *